April 28, 1925.

W. R. McGOWEN

VEHICLE BUMPER

Filed Feb. 9, 1924

1,535,169

INVENTOR

William R. McGowen
By Kay, Totten & Brown,
Attorneys.

Patented Apr. 28, 1925.

1,535,169

UNITED STATES PATENT OFFICE.

WILLIAM R. McGOWEN, OF CHICAGO, ILLINOIS, ASSIGNOR TO UNITED STATES CHAIN & FORGING COMPANY, OF PITTSBURGH, PENNSYLVANIA, A CORPORATION OF DELAWARE.

VEHICLE BUMPER.

Application filed February 9, 1924. Serial No. 691,665.

*To all whom it may concern:*

Be it known that I, WILLIAM R. McGOWEN, a citizen of the United States, and resident of Chicago, in the county of Cook and State of Illinois, have invented a new and useful Improvement in Vehicle Bumpers; and I do hereby declare the following to be a full, clear, and exact description thereof.

My invention relates to improvements in bumpers for automobiles and the like, and particularly to bumpers comprising a bar, rigid or otherwise, disposed transversely of the machine to which it is applied, and supported by springs designed to absorb the force of impacts on the bar resulting from collisions.

One object of my invention is to provide buffer springs for bumper bars of such form, and connected to the bars in such manner, that a maximum resistance is offered by springs of a given size to shocks or impacts upon the bumper, and one wherein the bumper bar is braced by the springs against thrusts in endwise direction.

Still another object of my invention is to simplify and improve generally the construction and operation of bumpers of the type referred.

Briefly stated, my invention comprises a bumper bar of channel section between the webs of which buffer springs of flat steel are secured, both ends of each spring having pivotal connections with the bar, and the springs being of such form that they brace the bar against endwise movement and also offer effective resistance to ordinary shocks or impacts against the front of the bar.

Figure 1:
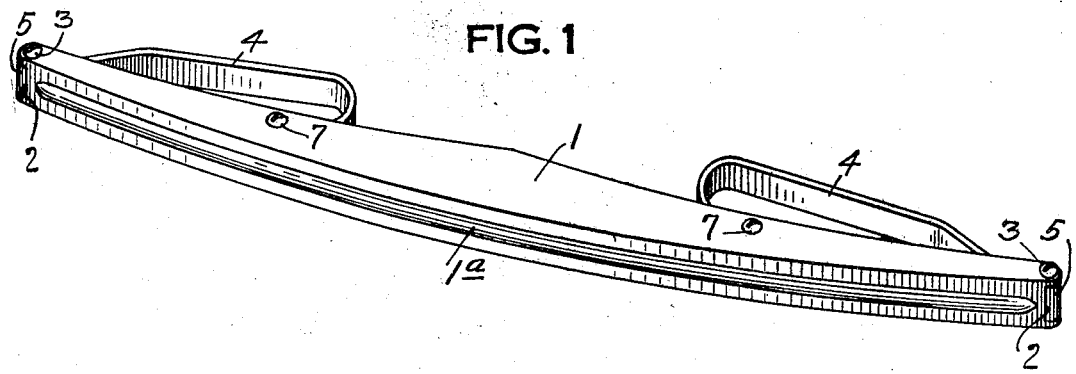
Figure 2:
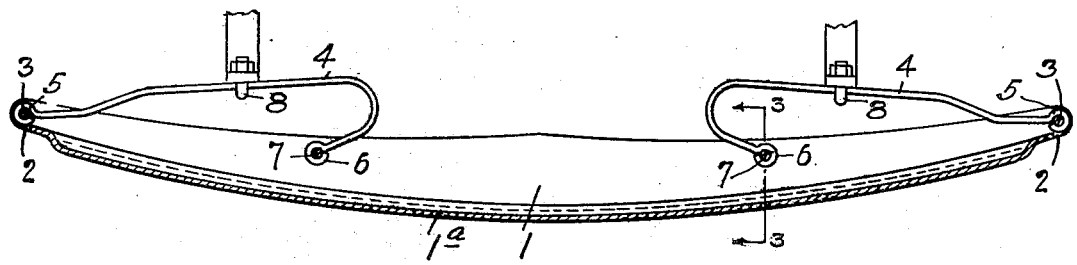
Figure 3:
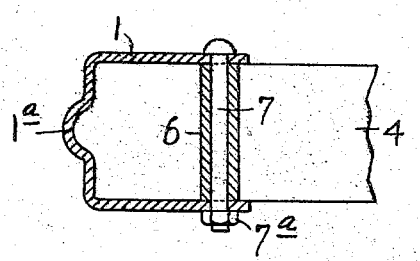

One form of my invention is shown in the accompanying drawing, wherein Fig. 1 is a perspective view of an automobile bumper embodying my invention; Fig. 2 is a view thereof, partially in plan and partially in section; and Fig. 3 is a view taken on the line 3—3, Fig. 2.

The device comprises a bumper bar 1, of channel form, preferably formed of a single piece of metal and curved slightly, as shown, and having a bead 1ª extending for substantially its entire length. The bead 1ª serves as a protection for the body portion of the bar 1 in that it constitutes an impact receiving device wherein distortion will take place, when obstructions such as posts or walls are encountered. Distortion resulting from collisions will in most cases be confined to the bead 1ª which can be more readily straightened than would be possible in the case of the body portion of the bar 1, and slight imperfections will not be so noticeable in the bead.

The web of the bar, at each end, is cut away slightly as indicated at 2, and the flanges are perforated for the reception of bolts 3. A pair of springs 4, each having its outer end extending in the general direction of the bar 1, has an eye 5 formed in said outer end through which the bolts 3 extend to form one pivotal connection between the spring and the bar, the outer side of the eye portion fitting within the recess 2. At their other ends, the springs are each bent more nearly at right angles to the bumper bar and are provided with an eye portion 6 through which a bolt 7 extends, the bolts 7 extending also through the flanges of the bumper bar 1, to form another pivotal connection between the spring and the bar 1. The springs 4 are attached to the vehicle by means of U-bolts 8 or in any other convenient manner.

It will be observed that the flanges of the bumper bar 1 are widest intermediate the ends of the bar, so that a tapering effect is secured, which adds to the appearance of the device, and also provides stronger sections toward the middle portion of the bar where the greatest strength is required, thus also effecting a saving in material without substantially reducing the effective strength of the bar. The outer ends of the springs 4 offer resistance to endwise movement of the bar 1 when thrusts are made thereon from a direction at an angle to that in which the vehicle is moving, while the inner ends of the springs 4 are so disposed that they more effectively absorb shocks imparted directly against the front of the bar 1.

The bolts 7 besides serving as pivots for the inner ends of the springs 4, also, together with their nuts 7ª as shown more clearly in Fig. 3, serve as tie members for the flanges of the channel bar 1 and thereby tend to hold the flanges of the bar against spreading apart, while the eye portions 6 of the springs 4 prevent the flanges being forced together. It will be apparent that the bar 1 cannot become distorted so long as its flanges are held against buckling, and that the bolts 7 and eye portions 6 resist buckling stresses such as are usually imparted by reason of impacts adjacent to the ends of the bumper.

Since both ends of each spring are pivotally connected to the bumper and held against movement longitudinally thereof, they are not likely to be distorted when compressed, inasmuch as they can more readily adjust themselves to various movements of the bumper bar than would be the case if both ends were rigidly attached to the bar.

Heretofore, it has been suggested that one end of the spring have sliding movement on the bumper bar, and that the other end be pivotally or otherwise attached thereto, but in such constructions no substantial resistance would be offered to endwise movement of the bumper bar and heavier springs would be required in order to offer a given amount of resistance, because one end of the spring being free to move longitudinally the bar, the spring could not offer the same resistance that it does when both ends are fastened against endwise movement, as in applicant's device.

What I claim is:

1. A bumper comprising a bar, a pair of springs, each having one end bent to semi-circular form, and its other end extending in the general direction of said bar, and means for pivotally connecting said ends to said bar.

2. A bumper comprising a bar and a spring bent intermediate its ends and having each end pivotally connected to said bar.

3. A bumper comprising a bar, a spring disposed adjacent to each end of said bar, each spring being bent to semi-circular form at that end nearest to the middle of said bar, and pivotal connections between each end of each spring and the bar.

4. A bumper comprising a channel bar of curved form having flanges tapering from the middle toward the ends thereof, a spring having its ends disposed between said flanges, and means pivotally connecting said spring ends to said flanges.

5. A bumper comprising a bar, a spring disposed adjacent to one side of said bar and spaced therefrom intermediate its ends, and means for pivotally connecting the ends of said spring to said bar and for holding said ends against movement longitudinally of the bar, the said spring being bent to semi-circular form adjacent to one of its ends.

6. A bumper comprising a channel bar provided with means intermediate the ends thereof for preventing buckling of its flanges.

7. A bumper for vehicles, comprising a channel bar, a spring disposed between the flanges of said bar and having close fitting engagement with said flanges, and a tie member for supporting said spring and preventing spreading movement of said flange members.

In testimony whereof I, the said WILLIAM R. McGOWEN, have hereunto set my hand.

WILLIAM R. McGOWEN.